No. 838,337. PATENTED DEC. 11, 1906.
H. JAPP.
VALVE FOR AIR LOCKS AND THE LIKE.
APPLICATION FILED SEPT. 10, 1906.
3 SHEETS—SHEET 1.
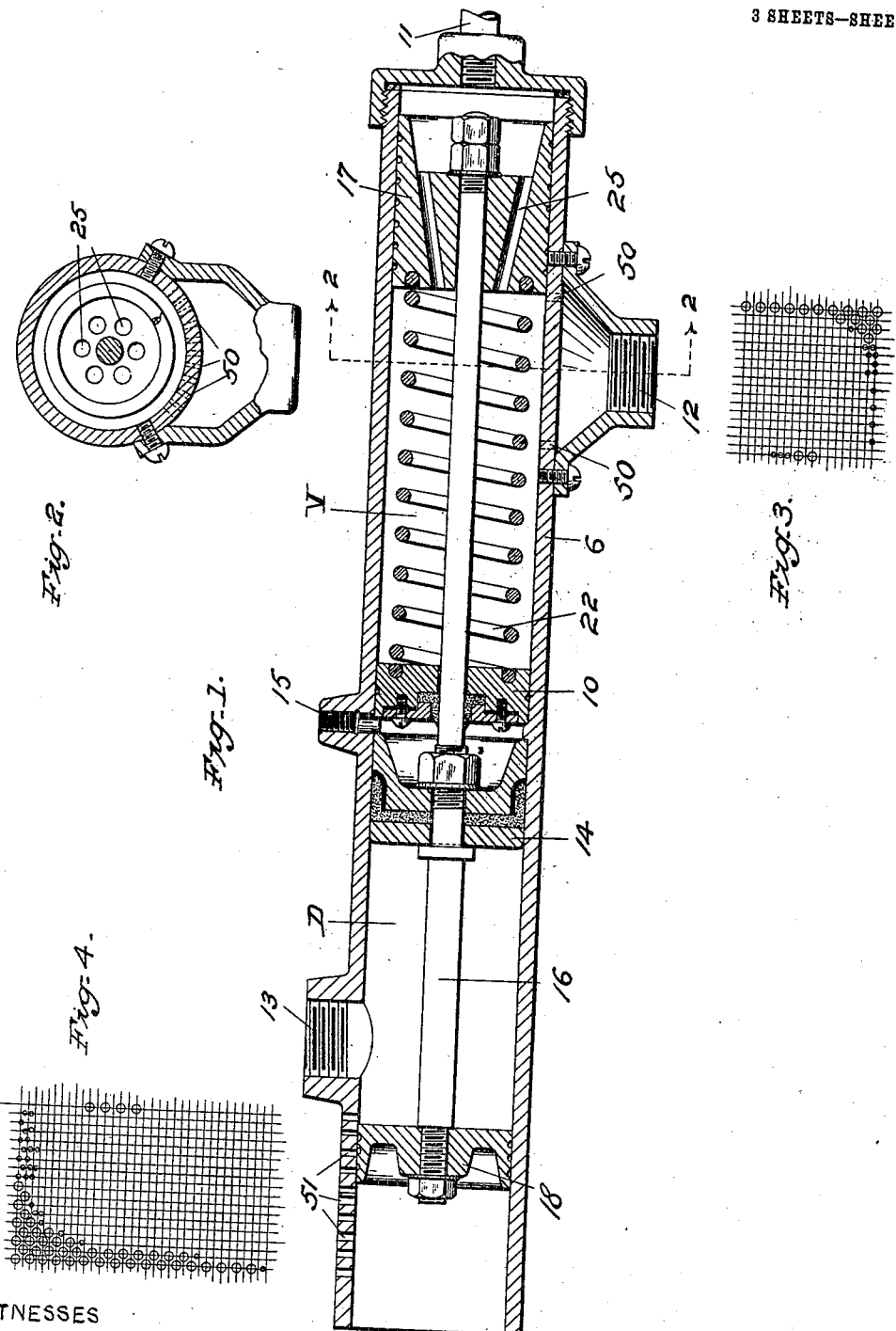
WITNESSES
William Abbe
E. W. Collins
INVENTOR
Henry Japp
by Howson and Howson
ATTORNEYS No. 838,337. PATENTED DEC. 11, 1906.
H. JAPP.
VALVE FOR AIR LOCKS AND THE LIKE.
APPLICATION FILED SEPT. 10, 1906.
3 SHEETS—SHEET 2.
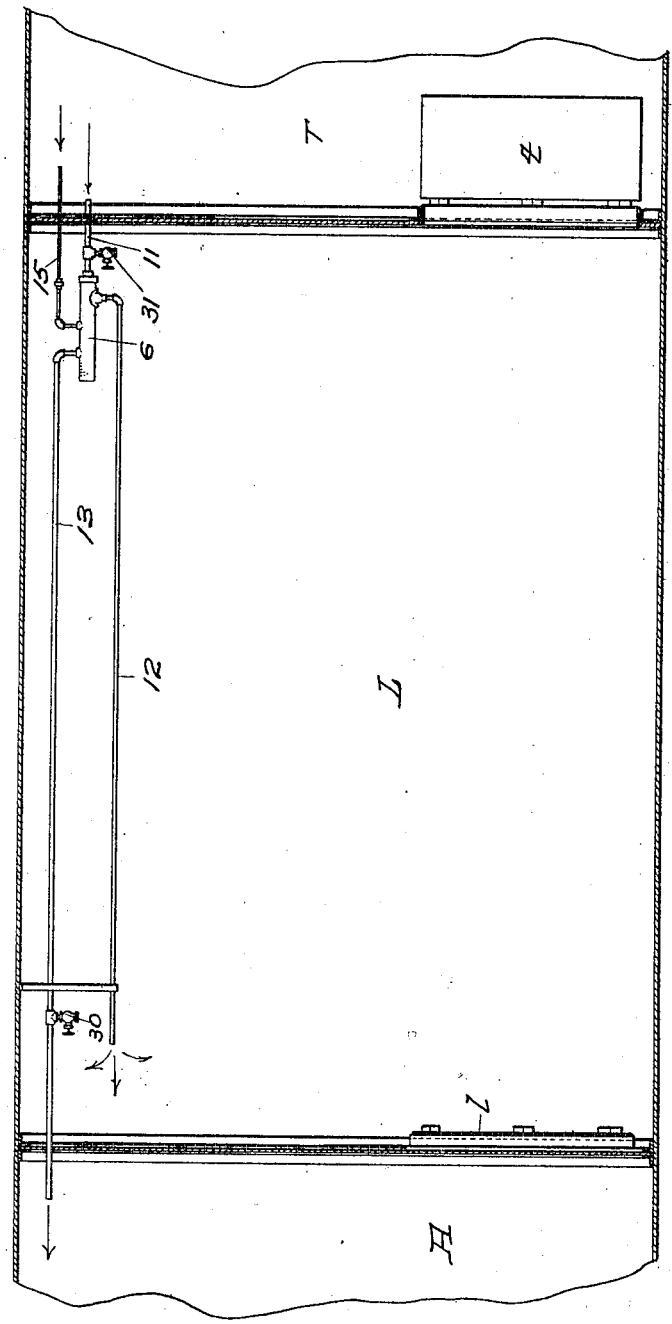
WITNESSES
William Abbe
E. W. Collins
INVENTOR
Henry Japp,
by Howson and Howson
ATTORNEYS No. 838,337. PATENTED DEC. 11, 1906.
H. JAPP.
VALVE FOR AIR LOCKS AND THE LIKE.
APPLICATION FILED SEPT. 10, 1906.
3 SHEETS—SHEET 3.
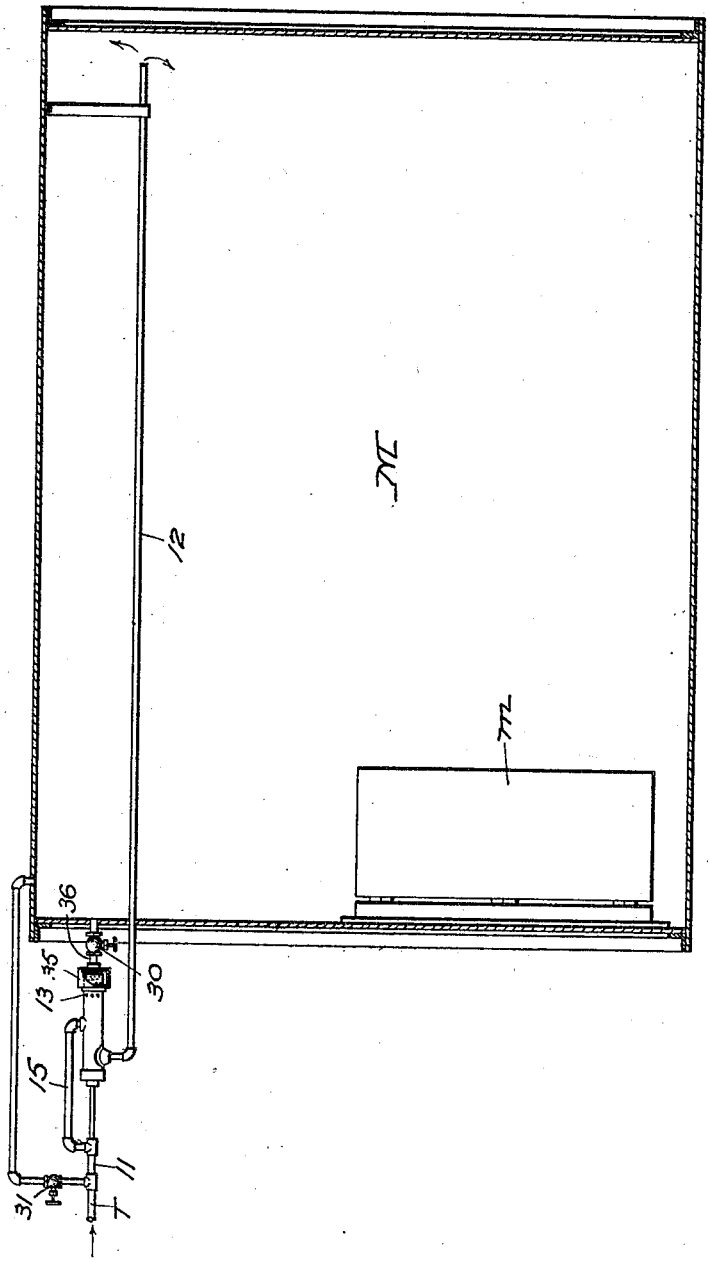
WITNESSES
INVENTOR

UNITED STATES PATENT OFFICE.

HENRY JAPP, OF NEW YORK, N. Y., ASSIGNOR TO S. PEARSON & SON, INC., OF LONG ISLAND CITY, NEW YORK, A CORPORATION OF NEW YORK.

VALVE FOR AIR-LOCKS AND THE LIKE.

No. 838,337.     Specification of Letters Patent.     Patented Dec. 11, 1906.

Application filed September 10, 1906. Serial No. 334,009.

*To all whom it may concern:*

Be it known that I, HENRY JAPP, a subject of the King of Great Britain and Ireland, residing in the borough of Manhattan, in the city, county, and State of New York, have invented certain new and useful Improvements in Valves for Air-Locks and the Like, of which the following is a full, clear, and exact specification.

My invention relates to valves for air-locks and the like; and the particular object of my invention is to provide a valve whereby may be effected automatically and uniformly both the decompression and the ventilation of the chamber.

In the accompanying drawings, Figure 1 is a longitudinal cross-section of my valve. Fig. 2 is a vertical section of the same on the line 2 2, Fig. 1. Fig. 3 is a diagram of the perforations in the valve-cylinder leading into the ventilating-pipe. Fig. 4 is a diagram of the holes in the valve-cylinder leading into the decompression-chamber or air-lock, and Fig. 5 is a side view of an air-lock with my valve arranged therein, and Fig. 6 is a side view of a decompression-chamber with my valve arranged on the outside.

It has been found that persons suffering from "caisson disease," due to the change from high pressure of a tunnel or like place where work is carried on under high pressure to the comparative low pressure of atmosphere are frequently best treated by returning them to conditions similar to those existing in the tunnel from which they have come and then gradually and slowly reducing the pressure to atmospheric condition. This may cover a considerable space of time, and it is necessary, therefore, to supply pure air to the chamber in which the patient is placed for this treatment.

It is the particular object of this invention to furnish a valve which shall automatically supply fresh air to such a chamber, as well as permit the gradual reduction of the pressure; but while this is the particular object of my invention it will be understood that the valve may be equally well applied to an air-lock in a tunnel, and it is so illustrated in the accompanying drawings, except Fig. 6.

Referring thereto, T represents the tunnel or source of high pressure, L the air-lock or decompression-chamber, and A represents the outer chamber of normal atmospheric pressure. At any suitable point in the lock is secured a cylinder 6. A fixed partition 10 therein divides the cylinder into two chambers, which, for convenience, may be called the "ventilation-chamber" V and the "decompression-chamber" D. The ventilation-chamber V is connected with the tunnel or high-pressure source T by the pipe 11, and the air from this source is considered of sufficient purity for ventilating purposes. Perforations 25 in the valve 17 permit the passage of air therethrough into the chamber V, while perforations 50 in the cylinder (diagrammatically illustrated in Fig. 3) permit the flow of air from the chamber V into the pipe 12, which discharges in the lock at a point distant from the valve, so as to secure a circulation of air and prevent the fresh air supplied by this means from being drawn out immediately through the intake of decompression-chamber D of the valve. This decompression-chamber D communicates with the atmosphere through the pipe 13, the air from the lock being admitted through the perforations 51 in the wall of the cylinder. (Illustrated in Fig. 4.)

The action of the valve is controlled by the piston 14, which is subjected to constant pressure from the tunnel or source of high pressure through the pipe 15, which opens into the space between the partition 10 and the piston 14.

At the respective ends of the piston-rod 16, which extends on each side of the piston 14, are affixed the perforated valve 17 and the combination secondary piston and valve 18. The valve 17, which is of greater width, it will be noted, than the space which is perforated to permit the flow of air from the chamber V into the pipe 12, and is thus capable of blocking the entire series of perforations, is so arranged that when the valve is at rest—that is, when the air-pressure is the same in the decompression-chamber and at the source of high pressure—the perforations 50 in the cylinder are all exposed, permitting as free a passage of air therethrough as possible from the chamber V into the pipe 12.

The piston 18, which is subjected on its outer face to the pressure of the air in the decompression-chamber, since the cylinder 6 is open at this end, is so arranged when the valve is at rest, as explained above, that only the first row of the perforations 51, leading into the decompression-chamber D, are open into the same, the rest being either behind the piston or blocked by it.

A coil-spring 22, seated against the partition 10 and acting upon the valve 17, retards the operation of the valve by counteracting in part the forces acting upon the piston 14 as the difference in air-pressure between that in the air-lock and that in the tunnel or source of pressure becomes greater.

So long as the pressure in the tunnel and that in the lock are the same, and this condition continues so long as the door $t$, leading into the tunnel, is open, while the door $l$, leading from the lock to atmosphere, is closed, there is no movement of the valve, and its function is to permit the outflow of air from the lock through the exposed row of holes 51 into the chamber D of the valve and thence to atmosphere through pipe 13. If now it is desired to decompress the lock L, the door $t$ is closed, the air-lock now resembling a decompression-chamber, which is open to the source of pressure only through pipe 11. Under these conditions it will be noted that the continued flow of air into the chamber D and out through pipe 13, caused by the difference in pressure between the air in the lock and that at atmosphere, immediately begins to reduce the air-pressure in the lock. This fall of pressure in the lock at once causes an inflow of fresh air from the tunnel or source of higher pressure through pipe 11, the ventilating-chamber V, and the pipe 12. This inflow would of course equal the outflow were not the two sets of perforations 50 51 so proportioned in number and size relatively to the differences in pressure between that of the tunnel and that of the lock on the one hand and that of the lock and that of the atmosphere on the other that the inflow from the tunnel is less than the outflow from the lock. There results, therefore, a constant fall of pressure in the lock. With this fall of pressure in the lock longitudinal movement of the piston begins, since the constant high pressure brought to bear upon the piston 14 through the pipe 15 is no longer met by the pressure upon the outer face of the piston 18, the latter being subject only to the pressure in the lock. This longitudinal movement of the piston-rod 16 and its attached parts brings the valve-head 17 over some of the perforations 50, cutting off to this extent the inflow-passage from the tunnel, while the valve-head 18 uncovers more of the perforations 51, through which the outflow takes place. A constant uniform decompression and ventilation are thereby secured.

A stop-cock 30, inserted in the outflow-pipe 13, either inside the chamber or outside, cuts off the escape of air from the chamber and permits the gradual compression of the atmosphere in the chamber again, sufficient air under pressure being admitted through the cock 31 to drive the valve 17 back from the last row of holes 50.

While I have described my valve as arranged within the chamber to be decompressed, it can be equally well arranged on the exterior, as shown in Fig. 6. Thus the pipe 11 is led to the ventilating-chamber V of the valve from the high-pressure source T, as before, the pipe 12 to a distant part of the chamber M for ventilation purposes, while the pipe 15 opens between the partition 10 and the piston 14, supplying constant pressure to the latter. Inasmuch as the valve is open to the air, the pipe 13, leading from the valve-chamber D, is done away with. It is necessary to box that end of the valve containing the perforations 51 and connect with the decompression-chamber, and this may be done simply by threading the valve-cylinder and screwing a cap 35 thereon and connecting by a pipe 36, as illustrated. The cocks 30 and 31 have the same function as before described—namely, to permit the recompression of the air in the chamber.

I claim as my invention—

1. A system including the combination of an air-lock, a source of air under pressure, and a chamber at a lower pressure than said source, with a device connected with said parts for ventilating and decompressing said air-lock, substantially as described.

2. A system including the combination of an air-lock, a source of air under pressure, and an air-chamber at a lower pressure than said source, with an automatically-acting device for ventilating and decompressing said air-lock, substantially as described.

3. A system including the combination of an air-lock, a source of air under pressure, and an air-chamber at a pressure lower than said source, with an automatically-acting valve placed in the air-lock and connected to said source of air-pressure and to the said chamber for ventilating and decompressing said air-lock.

4. A valve consisting of a casing, two connecting-pistons therein, a head connected to said pistons, there being two series of openings to the casing, of which one set is placed to coact with the head and the other set with one of the pistons, said casing being divided into chambers, and having connections for the admission of air under different pressures to said chambers.

5. The combination with an air-lock and two chambers under different pressures, having openings into said air-lock, and a valve connecting to the chambers and to the air-lock, said valve including means for permitting the flow of air from one chamber to the lock at a definite rate and other means for permitting the flow of air from the lock to the other chamber at a different rate.

6. The combination of a lock with two chambers under different air-pressures, doors for the lock respectively opening into said chambers and a valve connected to the chambers and to the lock, said valve including means for lowering the air-pressure in the lock at uniform rate when said doors are closed.

7. The combination of a lock with two chambers under different air-pressures, doors for the lock respectively opening into said chambers and a valve connected to the chambers and to the lock, said valve including means for lowering the air-pressure in the lock at a uniform rate when said doors are closed, while permitting constant flow of air into the lock from one of the chambers.

8. The combination of a casing having a partition dividing it into two parts, a piston-rod in the casing having two pistons and a valve connected to it, said casing being designed for the reception of connections to the space between the partition and one of the pistons, to the space between the pistons, and to the end of the cylinder on the other side of the partition, there being a series of relatively restricted openings into the space between the pistons placed to be controlled by one of the latter and other openings controlled by the valve.

9. The combination of an air-lock, a source of air under pressure and a chamber at atmospheric pressure with a valve in the air-lock connected to said source and to the chamber, there being a connection from the valve to the air-lock, means in the valve for controlling the flow of air from the source of supply thereof to said connection, and other means for controlling the flow of air from the lock to the chamber.

10. The combination of an air-lock, a source of air under pressure and a chamber at atmospheric pressure with a valve in the air-lock connected to said source and to the chamber, there being a connection from the valve to the air-lock, means in the valve for controlling the flow of air from the source of supply thereof to said connection, and other means for controlling the flow of air from the lock to the chamber, and a device actuated by air from the source of supply for operating said means, substantially as described.

In testimony whereof I have signed my name to this specification in the presence of two subscribing witnesses.

HENRY JAPP.

Witnesses:
　Louis Ph. Geyer,
　Geo. Meyeson.